(12) United States Patent
Chae et al.

(10) Patent No.: US 11,556,844 B2
(45) Date of Patent: Jan. 17, 2023

(54) ARTIFICIAL INTELLIGENCE ROBOT FOR DETERMINING CLEANING ROUTE USING SENSOR DATA AND METHOD FOR THE SAME

(71) Applicant: LG ELECTRONICS INC., Seoul (KR)

(72) Inventors: Seungah Chae, Seoul (KR); Kokeun Kim, Seoul (KR); Suyeon Kim, Seoul (KR); Kamin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 663 days.

(21) Appl. No.: 16/539,746

(22) Filed: Aug. 13, 2019

(65) Prior Publication Data

US 2019/0370691 A1  Dec. 5, 2019

(30) Foreign Application Priority Data

Jul. 12, 2019 (KR) .......................... 10-2019-0084757

(51) Int. Cl.
*G06N 20/00* (2019.01)
*G05D 1/02* (2020.01)
(Continued)

(52) U.S. Cl.
CPC ............ *G06N 20/00* (2019.01); *A47L 9/2826* (2013.01); *A47L 9/2847* (2013.01); *A47L 9/2852* (2013.01);
(Continued)

(58) Field of Classification Search
CPC ........ G06N 20/00; G06N 5/02; A47L 9/2826; A47L 9/2847; A47L 9/2852;
(Continued)

(56) References Cited

U.S. PATENT DOCUMENTS 10,660,496 B2 * 5/2020 Han ...................... A47L 9/009
11,199,853 B1 * 12/2021 Afrouzi ................ G05D 1/0274
(Continued)

FOREIGN PATENT DOCUMENTS

| KR | 20130091879 | 8/2013 |
| KR | 20150104311 | 9/2015 |
| KR | 20190007284 | 1/2019 |

OTHER PUBLICATIONS

Korean Intellectual Property Office Application No. 10-2019-0084757, Office Action dated Dec. 11, 2020, 5 pages.

*Primary Examiner* — Jeff A Burke
*Assistant Examiner* — Joshua Alexander Garza
(74) *Attorney, Agent, or Firm* — Lee Hong Degerman Kang Waimey

(57) ABSTRACT

An embodiment of the present invention provides an artificial intelligence (AI) robot for determining a cleaning route using sensor data, comprising: a sensor unit including at least one of an image sensor, a depth sensor or a shock sensor; a cleaning unit including at least one of a suction unit or a mopping unit; a driving unit configured to drive the AI robot; and a processor configured to: acquire the sensor data from the sensor unit, determine a complex area using the acquired sensor data, create a virtual wall for blocking an entry into the determined complex area, determine the cleaning route in consideration of the created virtual wall, and control the cleaning unit and the driving unit based on the determined cleaning route.

12 Claims, 16 Drawing Sheets

(51) Int. Cl.
*A47L 9/28* (2006.01)
*A47L 11/40* (2006.01)
*G06N 5/02* (2006.01)

(52) U.S. Cl.
CPC ........ *A47L 11/4011* (2013.01); *G05D 1/0212* (2013.01); *G05D 1/0231* (2013.01); *G06N 5/02* (2013.01); *A47L 2201/04* (2013.01); *A47L 2201/06* (2013.01); *G05D 2201/0203* (2013.01); *G05D 2201/0215* (2013.01)

(58) Field of Classification Search
CPC ............. A47L 11/4011; A47L 2201/04; A47L 2201/06; G05D 1/0212; G05D 1/0231; G05D 2201/0203; G05D 2201/0215
See application file for complete search history.

(56) References Cited

U.S. PATENT DOCUMENTS

| | | | |
|---|---|---|---|
| 2013/0206177 A1 | 8/2013 | Burlutskiy | |
| 2015/0250372 A1 | 9/2015 | T P et al. | |
| 2016/0297072 A1* | 10/2016 | Williams | B25J 9/1694 |
| 2018/0004212 A1* | 1/2018 | Tang | G05D 1/0255 |
| 2019/0015984 A1 | 1/2019 | Woo et al. | |
| 2019/0025838 A1* | 1/2019 | Artes | G05D 1/0246 |
| 2020/0150655 A1* | 5/2020 | Artes | G05D 1/0214 |
| 2020/0218274 A1* | 7/2020 | Lee | G05D 1/0251 |
| 2020/0348666 A1* | 11/2020 | Han | A47L 9/2805 |
| 2021/0068605 A1* | 3/2021 | Kim | G05D 1/0291 |

\* cited by examiner (a)

(b)

(c)

(a)

(b)

ARTIFICIAL INTELLIGENCE ROBOT FOR DETERMINING CLEANING ROUTE USING SENSOR DATA AND METHOD FOR THE SAME

CROSS-REFERENCE TO RELATED APPLICATIONS

Pursuant to 35 U.S.C. § 119(a), this application claims the benefit of earlier filing date and right of priority to Korean Patent Application No. 10-2019-0084757, filed on Jul. 12, 2019 in Korea, the contents of which are hereby incorporated by reference herein in its entirety.

BACKGROUND

The present invention relates to an artificial intelligence (AI) robot for determining a cleaning route using sensor data and a method for the same. In particular, the present invention relates to an AI robot for determining a cleaning route of preferentially cleaning an uncomplicated area by determining an area complicated to clean using sensor data, and a method for the same.

A robot cleaner is an artificial intelligence (AI) device or an AI robot which automatically cleans by voluntarily driving in an area to clean without any manipulation of a user and simultaneously sucking foreign materials such as dust and the like from a floor surface.

Generally, a robot cleaner proceeds to clean while avoiding obstacles if there are the obstacles by considering only an environment of a predetermined radius (e.g., a radius of 25 cm) on the basis of the cleaner without considering an overall cleaning area. This is why the robot cleaner can wander every time in an area where the robot cleaner wandered before, such as an area where the cleaning takes a long time, an area where the robot cleaner hits obstacles, or the like.

Specifically, in an area including many obstacles, the robot cleaner can be restricted because its cleaning requires a long time or its movement is limited. Further, the robot cleaner often clears up a specific area as compared to other areas.

SUMMARY

The present invention is to provide an AI robot for determining a cleaning route of posteriorly cleaning an area difficult to clean by acquiring sensor data in real time and a method for the same.

In addition, the present invention is to provide an AI robot and a method for the same, for determining a cleaning route of posteriorly cleaning an area having high restrainability, such as an area where the AI robot is difficult to enter, as well as an area where obstacles are placed.

An embodiment of the present invention provides an AI robot for performing cleaning and a method for the same, by acquiring sensor data using at least one of an image sensor, a depth sensor or a shock sensor, determining a complex area using the acquired sensor data, creating a virtual wall for blocking an entry into the determined complex area, determining the cleaning route in consideration of the virtual wall, and controlling a cleaning unit and a driving unit based on the determined cleaning route.

In addition, an embodiment of the present invention provides an AI robot for determining a cleaning route and a method for the same, by creating a virtual wall in real time using sensor data acquired in real time and an around map with regard to a predetermined radius around the AI robot.

In addition, an embodiment of the present invention provides an AI robot for determining a new cleaning route and a method for the same, by mapping a created virtual wall on an SLAM map and determining the new cleaning route by excluding the virtual wall, if the cleaning along the cleaning route in consideration of the virtual wall is completed.

In accordance with various embodiments of the present invention, since the AI robot determines an area difficult to clean based on sensor data acquired in real time, the AI robot may determine a stable cleaning route by undergoing low influences from errors or noises of an SLAM map.

In addition, in accordance with various embodiments of the present invention, since the AI robot determines the cleaning route using the sensor data acquired in real time, the AI robot may determine the cleaning route by flexibly responding to an environmental change in a cleaning space.

Furthermore, in accordance with various embodiments of the present invention, the AI robot does not determine a cleaning route of simply posteriorly cleaning a space in which obstacles are placed, and determines a cleaning route such that the AI robot posteriorly enters and cleans even a space difficult to enter, thereby lowering restrainability in cleaning operation of the AI robot.

DETAILED DESCRIPTION OF THE EMBODIMENTS

Figure 1:
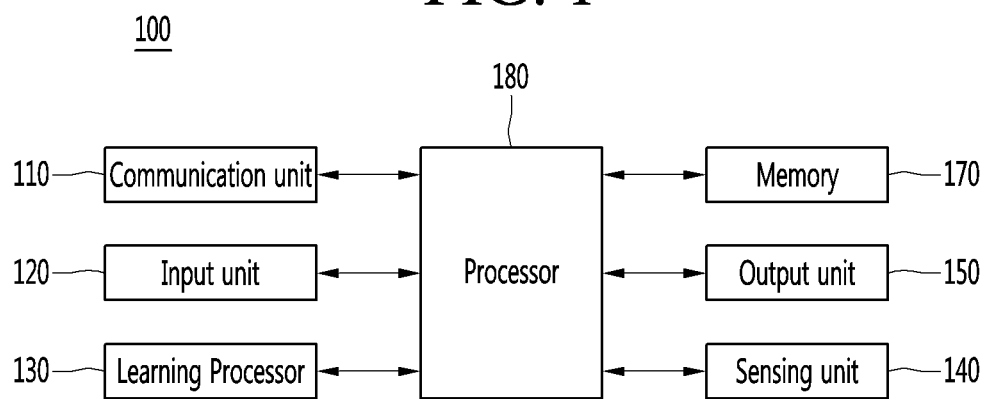
FIG. 1 is a block diagram illustrating an AI apparatus according to an embodiment of the present invention.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network must infer when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 is a block diagram illustrating an AI apparatus 100 according to an embodiment of the present invention.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication unit 110, an input unit 120, a learning processor 130, a sensing unit 140, an output unit 150, a memory 170, and a processor 180.

The communication unit 110 may transmit and receive data to and from external devices such as other AI apparatuses 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™ RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a training data for model learning and an input data to be used when an output is acquired using learning model. The input unit 120 may acquire raw input data. In this case, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing unit 140 may acquire at least one of internal information about the AI apparatus 100, ambient environment information about the AI apparatus 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI apparatus 100. For example, the memory 170 may store input data acquired by the input unit 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
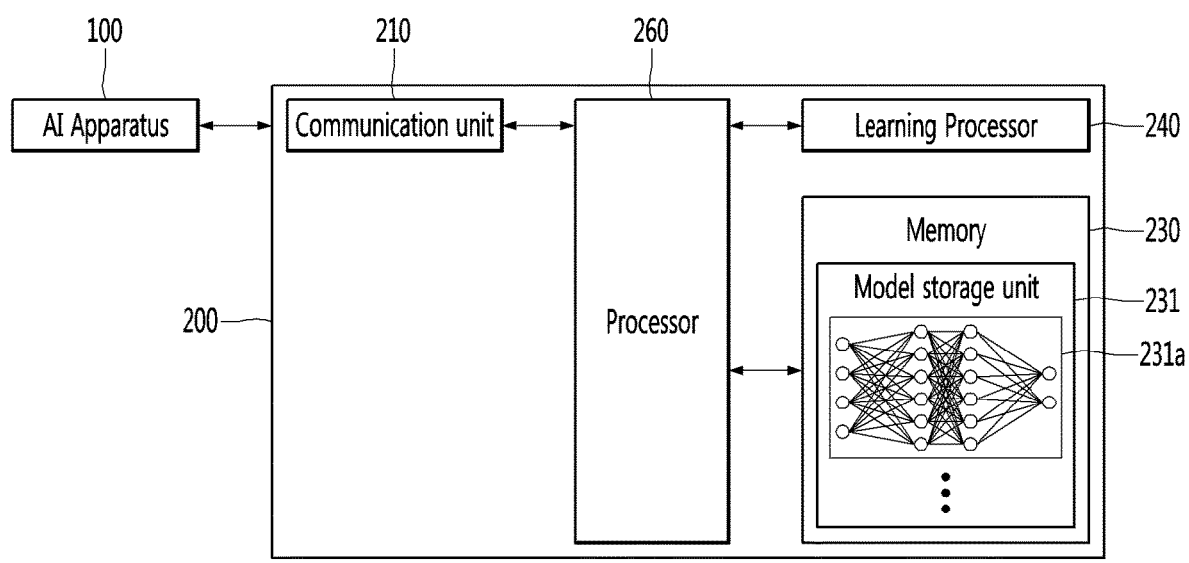
FIG. 2 is a block diagram illustrating an AI server according to an embodiment of the present invention.

FIG. 2 is a block diagram illustrating an AI server 200 according to an embodiment of the present invention.

Referring to FIG. 2, the AI server 200 may refer to a device that learns an artificial neural network using a machine learning algorithm or uses a learned artificial neural network. The AI server 200 may include a plurality of servers to perform distributed processing, or may be defined as a 5G network. At this time, the AI server 200 may be included as a partial configuration of the AI apparatus 100, and may perform at least part of the AI processing together.

The AI server 200 may include a communication unit 210, a memory 230, a learning processor 240, a processor 260, and the like.

The communication unit 210 can transmit and receive data to and from an external device such as the AI apparatus 100.

The memory 230 may include a model storage unit 231. The model storage unit 231 may store a learning or learned model (or an artificial neural network 231a) through the learning processor 240.

The learning processor 240 may learn the artificial neural network 231a by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models is implemented in software, one or more instructions that constitute the learning model may be stored in memory 230.

The processor 260 may infer the result value for new input data using the learning model and may generate a response or a control command based on the inferred result value.

Figure 3:
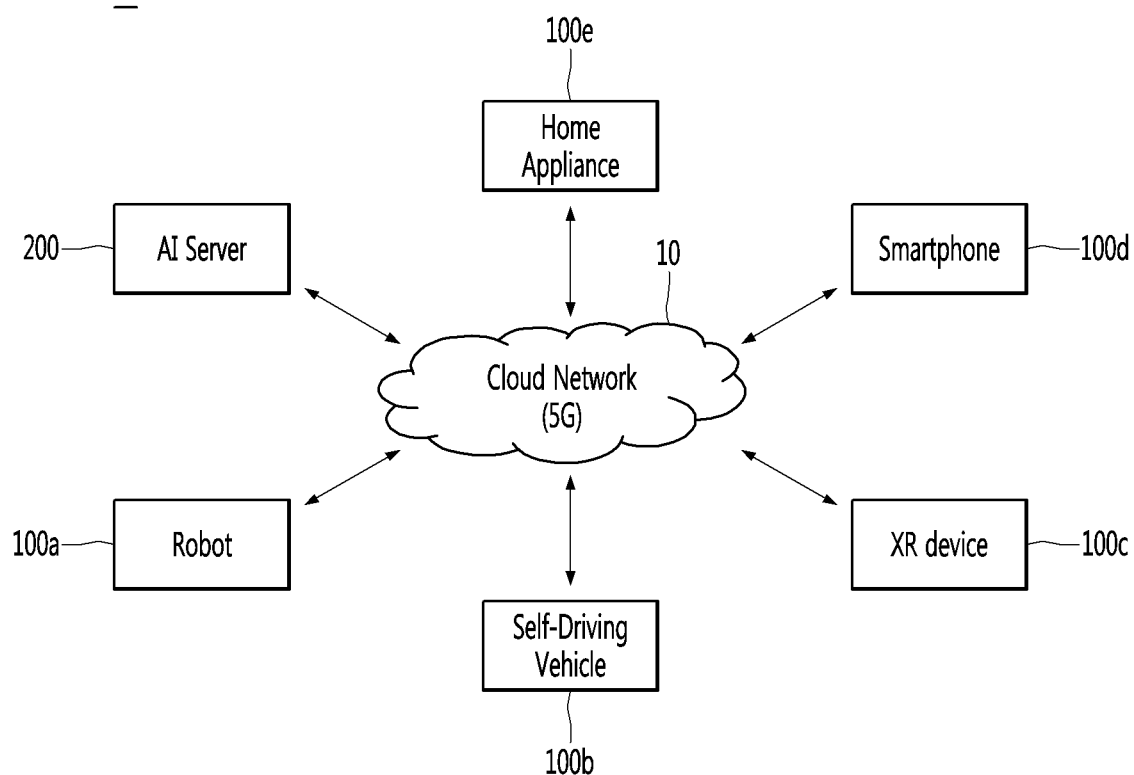
FIG. 3 is a diagram illustrating an AI system according to an embodiment of the present invention.

FIG. 3 is a diagram illustrating an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI apparatuses 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100a, the self-driving vehicle 100b, the XR device 100c, the smartphone 100d, or the home appliance 100e through the cloud network 10, and may assist at least part of AI processing of the connected AI apparatuses 100a to 100e.

At this time, the AI server 200 may learn the artificial neural network according to the machine learning algorithm instead of the AI apparatuses 100a to 100e, and may directly store the learning model or transmit the learning model to the AI apparatuses 100a to 100e.

At this time, the AI server 200 may receive input data from the AI apparatuses 100a to 100e, may infer the result value for the received input data by using the learning model, may generate a response or a control command based on the inferred result value, and may transmit the response or the control command to the AI apparatuses 100a to 100e.

Alternatively, the AI apparatuses 100a to 100e may infer the result value for the input data by directly using the learning model, and may generate the response or the control command based on the inference result.

Hereinafter, various embodiments of the AI apparatuses 100a to 100e to which the above-described technology is applied will be described. The AI apparatuses 100a to 100e illustrated in FIG. 3 may be regarded as a specific embodiment of the AI apparatus 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100*a* interacting with the self-driving vehicle 100*b* may control or assist the self-driving function of the self-driving vehicle 100*b* by acquiring sensor information on behalf of the self-driving vehicle 100*b* and providing the sensor information to the self-driving vehicle 100*b*, or by acquiring sensor information, generating environment information or object information, and providing the information to the self-driving vehicle 100*b*.

Alternatively, the robot 100*a* interacting with the self-driving vehicle 100*b* may monitor the user boarding the self-driving vehicle 100*b*, or may control the function of the self-driving vehicle 100*b* through the interaction with the user. For example, when it is determined that the driver is in a drowsy state, the robot 100*a* may activate the self-driving function of the self-driving vehicle 100*b* or assist the control of the driving unit of the self-driving vehicle 100*b*. The function of the self-driving vehicle 100*b* controlled by the robot 100*a* may include not only the self-driving function but also the function provided by the navigation system or the audio system provided in the self-driving vehicle 100*b*.

Alternatively, the robot 100*a* that interacts with the self-driving vehicle 100*b* may provide information or assist the function to the self-driving vehicle 100*b* outside the self-driving vehicle 100*b*. For example, the robot 100*a* may provide traffic information including signal information and the like, such as a smart signal, to the self-driving vehicle 100*b*, and automatically connect an electric charger to a charging port by interacting with the self-driving vehicle 100*b* like an automatic electric charger of an electric vehicle.

<AI+Robot+XR>

The robot 100*a*, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100*a*, to which the XR technology is applied, may refer to a robot that is subjected to control/interaction in an XR image. In this case, the robot 100*a* may be separated from the XR device 100*c* and interwork with each other.

When the robot 100*a*, which is subjected to control/interaction in the XR image, may acquire the sensor information from the sensors including the camera, the robot 100*a* or the XR device 100*c* may generate the XR image based on the sensor information, and the XR device 100*c* may output the generated XR image. The robot 100*a* may operate based on the control signal input through the XR device 100*c* or the user's interaction.

For example, the user can confirm the XR image corresponding to the time point of the robot 100*a* interworking remotely through the external device such as the XR device 100*c*, adjust the self-driving travel path of the robot 100*a* through interaction, control the operation or driving, or confirm the information about the surrounding object.

<AI+Self-Driving+XR>

The self-driving vehicle 100*b*, to which the AI technology and the XR technology are applied, may be implemented as a mobile robot, a vehicle, an unmanned flying vehicle, or the like.

The self-driving driving vehicle 100*b*, to which the XR technology is applied, may refer to a self-driving vehicle having a means for providing an XR image or a self-driving vehicle that is subjected to control/interaction in an XR image. Particularly, the self-driving vehicle 100*b* that is subjected to control/interaction in the XR image may be distinguished from the XR device 100*c* and interwork with each other.

The self-driving vehicle 100*b* having the means for providing the XR image may acquire the sensor information from the sensors including the camera and output the generated XR image based on the acquired sensor information. For example, the self-driving vehicle 100*b* may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100*b*, at least part of the XR object may be output so as to overlap the object in the screen. For example, the self-driving vehicle 100*b* may output XR objects corresponding to objects such as a lane, another vehicle, a traffic light, a traffic sign, a two-wheeled vehicle, a pedestrian, a building, and the like.

When the self-driving vehicle 100*b*, which is subjected to control/interaction in the XR image, may acquire the sensor information from the sensors including the camera, the self-driving vehicle 100*b* or the XR device 100*c* may generate the XR image based on the sensor information, and the XR device 100*c* may output the generated XR image. The self-driving vehicle 100*b* may operate based on the control signal input through the external device such as the XR device 100*c* or the user's interaction.

Figure 4:
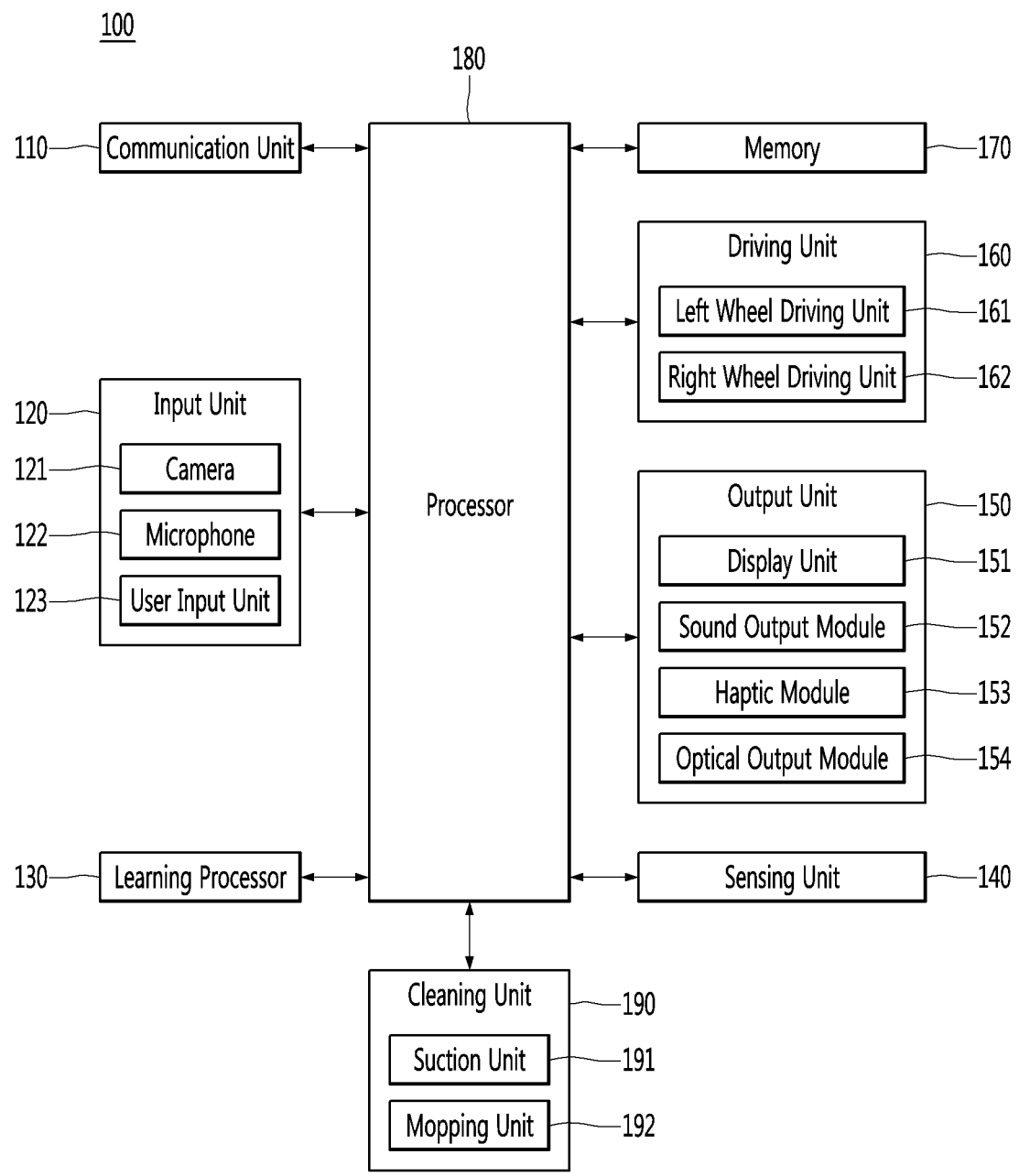
FIG. 4 is a block diagram illustrating an AI apparatus according to an embodiment of the present invention.

FIG. 4 is a block diagram illustrating an AI apparatus 100 according to an embodiment of the present invention.

The descriptions overlapping with FIG. 1 are omitted.

Hereinafter, the AI apparatus or the artificial intelligence apparatus may be referred to as an AI robot or an artificial intelligence robot.

Referring to FIG. 4, the AI apparatus 100 may further include a driving unit 160 and a cleaning unit 190.

The input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 120 is used for inputting image information (or signal), audio information (or signal), data, or information inputted from a user and the AI robot 100 may include at least one camera 121 in order to input image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the AI robot 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the AI robot 100 to correspond to the inputted information.

The user input unit 123 may include a mechanical input means (or a mechanical key, for example, a button, a dome switch, a jog wheel, and a jog switch at the front, back or side of the AI robot 100) and a touch type input means. As one example, a touch type input means may include a virtual key, a soft key, or a visual key, which is displayed on a touch screen through software processing or may include a touch key disposed at a portion other than the touch screen.

The sensing unit 140 may be referred to as a sensor unit.

The sensing unit 140 may include at least one of a depth sensor (not shown), an RGB sensor (not shown), a collision sensing sensor (not shown), and a precipice sensor (not shown), and may acquire image data around the AI apparatus 100.

The depth sensor may sense that light irradiated from a light emitting unit (not shown) is reflected from an object and is returned. The depth sensor may measure a distance from the object, based on a difference of a time to sense the returned light, an amount of the returned light and the like.

The depth sensor may acquire two-dimensional image information or three-dimensional image information around the AI robot 100, based on the distance between measured objects.

The RGB sensor may acquire color image information for an object or a user around the AI robot 100. The color image information may be an imaging image of the object. The RGB sensor camera may be referred to as an RGB camera.

At this time, the camera 121 may mean the RGB sensor.

The collision sensing sensor may be referred to as a bumper sensor, and may measure a collision amount.

The precipice sensor may be referred to as a cliff sensor, and may measure a distance to a bottom surface of the AI apparatus 100.

At this time, the cliff sensor may be implemented as a light sensor or a depth sensor.

The sensor information acquired from the sensing unit 140 can be used in detecting objects or obstacles.

The output unit 150 may include at least one of a display unit 151, a sound output module 152, a haptic module 153, or an optical output module 154.

The display unit 151 may display (output) information processed in the AI robot 100. For example, the display unit 151 may display execution screen information of an application program running on the AI robot 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the AI robot 100 and a user, and an output interface between the AI robot 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI robot 100. An example of an event occurring in the AI robot 100 includes message reception, call signal reception, missed calls, alarm, schedule notification, e-mail reception, and information reception through an application.

The driving unit 160 may move the AI robot 100 in a specific direction or by a specific distance.

The driving unit 160 may include a left wheel driving unit 161 that drives a left wheel of the AI robot 100 and a right wheel driving unit 162 that drives a right wheel of the AI robot 100.

The left wheel driving unit 161 may include a motor for driving the left wheel, and the right wheel driving unit 162 may include a motor for driving the left wheel.

FIG. 4 described with an example that the driving unit 160 includes the left wheel driving unit 161 and the right wheel driving unit 162, but the present invention is not limited thereto. That is to say, in an embodiment, the driving unit 160 may be composed of only one wheel.

The cleaning unit 190 may include at least one of a suction unit 191 or a mopping unit 192, and clean a floor surface around the AI robot 100.

The suction unit 191 may be referred to as a vacuum cleaner or a vacuum cleaning unit.

The suction unit 191 may suck foreign materials such as dust, debris or like around the AI robot 100 by inhaling air.

At this time, the suction unit 191 may include a brush and the like, as a means for collecting the foreign materials.

The mopping unit 192 may mop a floor in a state that a mop is in at least partly contact with a floor surface of the AI robot 100.

At this time, the mopping unit 192 may include the mop, a mop driving unit for moving the mop and the like.

At this time, the mop of the mopping unit 192 may adjust a distance from the ground through the mop driving unit. That is to say, the mop driving unit may operate so that the mop can be in contact with the ground if mopping is necessary.

Figure 5:
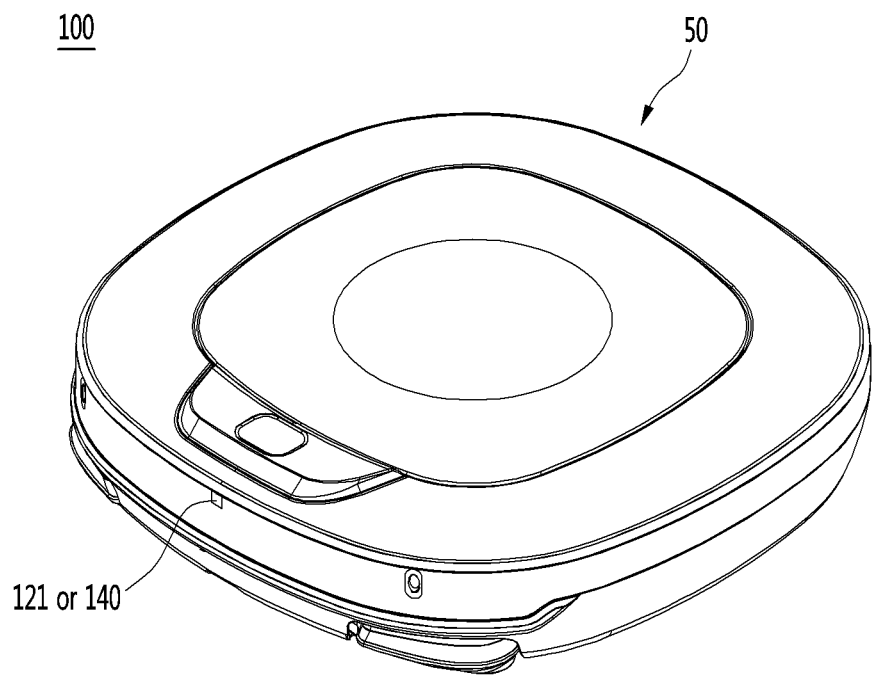
FIG. 5 is a perspective view of an AI robot according to an embodiment of the present invention.

FIG. 5 is a perspective view of an AI robot 100 according to an embodiment of the present invention.

Referring to FIG. 5, the AI robot 100 may include a cleaner body 50 and a camera 121 or a sensing unit 140.

The camera 121 or the sensing unit 140 may irradiate light ahead and receive reflected light.

The camera 121 or the sensing unit 140 may acquire depth information by using a difference of a time to return the received light.

The cleaner body 50 may include other elements except the camera 121 and the sensing unit 140 among the elements described in FIG. 4.

Figure 6:
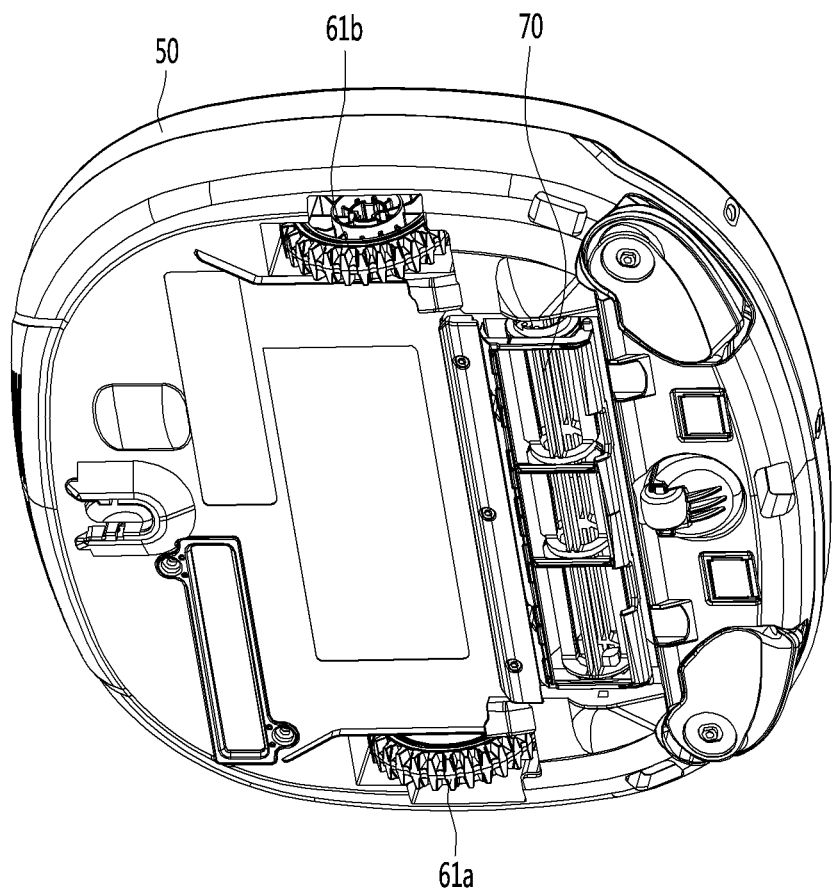
FIG. 6 is a bottom view of an AI robot according to an embodiment of the present invention.

FIG. 6 is a bottom view of an AI robot 100 according to an embodiment of the present invention.

Referring to FIG. 6, the AI robot 100 may further include the cleaner body 50, a left wheel 61a, a right wheel 61b and a suction unit 70, in addition to the constitution of FIG. 4.

The left wheel 61a and the right wheel 61b may drive the cleaner body 50.

The left driving unit 161 may drive the left wheel 61a, and the right driving unit 162 may drive the right wheel 61b.

As the left wheel 61a and the right wheel 61b rotate by the driving unit 160, the AI robot 100 may suck the foreign materials such as dust, debris or like, through the suction unit 70.

The suction unit 70 is included in the cleaner body 50 and may suck dust on a floor surface.

The suction unit 70 may further include a filter (not shown) for gathering the foreign materials from inhaled airstream, and a foreign material receptor (not shown) in which the foreign materials gathered by the filter are accumulated.

In addition, the AI robot 100 may further include a mopping unit (not shown), in addition to the constitution of FIG. 4.

The mopping unit (not shown) may include a mop (not shown) and a motor (not shown) that rotates the mop in a state that the mop is in contact with the floor surface or moves according to a set pattern.

The AI robot 100 may mop the floor surface through the mopping unit (not shown).

Figure 7:
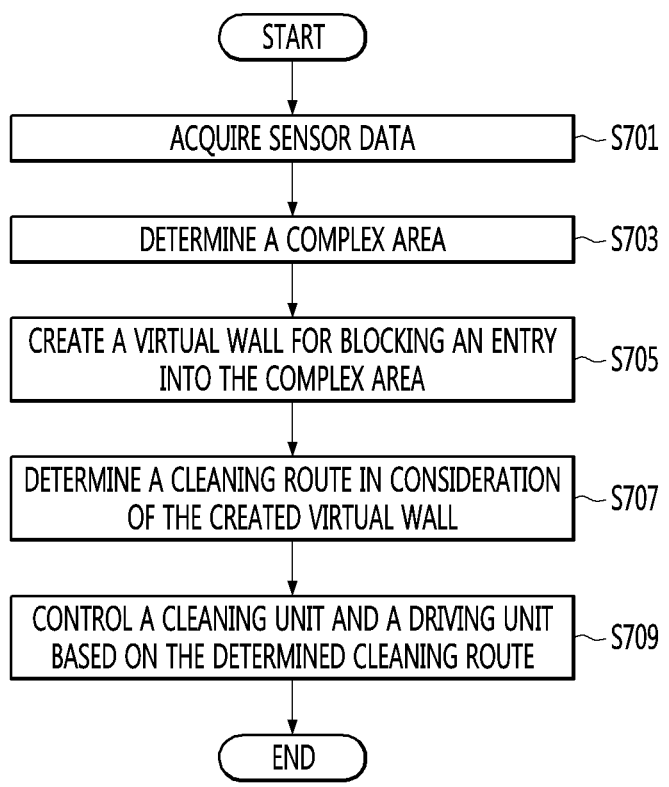
FIG. 7 is a flowchart illustrating a method for determining a cleaning route using sensor data according to an embodiment of the present invention.

FIG. 7 is a flowchart illustrating a method for determining a cleaning route using sensor data according to an embodiment of the present invention.

Referring to FIG. 7, a processor 180 of the AI robot 100 acquires sensor data through the sensor unit 140 (S701).

The processor 180 acquires the sensor data around through the sensor unit 140 when cleaning operation starts.

As described above, the sensor unit 140 may include the image sensor, the depth sensor, the collision sensing sensor, the cliff sensor and the forth.

The sensor data may include a direction to a specific point, a distance to a specific point, a collision location, a collision amount and so forth. In addition, the sensor data may include current location information of the AI robot 100.

Current location information of the AI robot 100 may be expressed with coordinates using GPS, but may be expressed with a displacement from a start location based on a drive record of the AI robot 100.

The memory 170 may store the sensor data acquired during a predetermined period.

For example, the memory 170 may store only the sensor data acquired for the last 30 minutes, and delete other sensor data.

At this time, the processor 180 may map the acquired sensor data on an around map as a map around the AI robot 100.

The around map is a map showing an around space within a predetermined radius from the AI robot 100, and, for example, may be a map for an around space within a 30 cm radius from the AI robot 100.

An SLAM (Simultaneous Localization And Mapping) map is a global map for an overall space in which the AI robot 100 operates, and the around map is a local map for the around space of the AI robot 100. In terms of these matters, the around map is different from the SLAM map.

Further, the processor 180 may map the acquired sensor data on the SLAM map.

Then, the processor 180 of the AI robot 100 determines a complex area based on the acquired sensor data (S703).

The complex area may mean an area that includes many obstacles or is very narrow for the AI robot 100 to enter.

If there is more than any number of obstacles in a specific area based on a rule, or any number of spaces capable of entering is less than a predetermined level, the processor 180 may determine the corresponding area as the complex area, but may determine whether the specific area is the complex area, by using a complex area determination model learned using the machine learning algorithm or the deep learning algorithm.

The complex area determination model may be a model that outputs a determined result by judging and determining a complex area and a non-complex area within the inputted area, when the sensor data for a predetermined area is inputted.

At this time, if coordinates information for a space and sensor data of each coordinate are inputted, the complex area determination model may output whether the inputted area is the complex area in each coordinate for the corresponding space.

In addition, if the around map showing a map for an around space of the AI robot 100 including the sensor data is inputted, the complex area determination model may output the around map on which the complex map is mapped.

At this time, the complex area determination model may be composed of an artificial neural network.

At this time, the complex area determination model may be a model learned by supervised learning by using training data including sensor data for the specific area and a label indicating whether the corresponding area is the complex area.

In addition, the complex area determination model may be a model learned by supervised learning by using training data including the around map and a label indicating information for the complex area on the corresponding around map, where the around map includes the sensor data.

The complex area determination model may be learned in the learning processor 130 of the AI robot 100, or may be learned in the learning processor 240 of the AI server 200. Further, the complex area determination model may be stored in the memory 170 of the AI robot 100, or may be stored in the memory 230 or the model storage unit 231 of the AI server 200.

If the complex area determination model is stored in the memory 170 of the AI robot 100, the processor 180 may determine the complex area by using the acquired sensor data and the complex area determination model stored in the memory 170.

If the complex area determination model is stored in the memory 230 of the AI server 200, the processor 180 may transmit the acquired sensor data to the AI server 200 through the communication unit 110, and may receive a result for the complex area determined by using the sensor data and the complex area determination model from the AI server 200.

The sensor data is acquired continuously, and the sensor data acquired at a time may include sensor values corresponding to specific viewpoints, and the complex area determination model may determine the complex area in the specific viewpoints by using the sensor data.

For example, if it is assumed that the sensor data acquired at some time includes sensor values corresponding to a first area, a second area, a third area and a fourth area, the complex area determination model may output whether each of a first area, a second area, a third area and a fourth area is the complex area. Herein, the first to fourth areas are only one example, and the sizes of each area may have a predetermined size (e.g., 5 cm×5 cm), and may be a pixel or voxel unit.

In an embodiment, the processor 180 may map a result of determining whether an area in the SLAM map is the complex area.

For example, if a first area of the SLAM map was determined to be the complex area in the complex area determination model, the processor 180 may map information such as the complex area for the first area of the SLAM map.

Then, the processor 180 of the AI robot 100 creates a virtual wall for blocking an entry into the area determined to be the complex area (S705).

The virtual wall may mean an area for blocking an access such that the AI robot 100 does not pass. Hence, an access restricted area may be named instead of an expression like the virtual wall.

At this time, the virtual wall may be created even in an area into which the AI robot 100 having no obstacles can access or enter, as well as in an area determined to be the complex area by including actual obstacles and the like.

That is to say, the virtual wall is created as a use for interrupting the access of the AI robot 100, and may not be consistent with or have an inclusion relation with the areas determined to be the actual complex area.

For example, the processor 180 may create the virtual wall all over the area determined to be the complex area, but create the virtual wall only in a passage to enter into the area determined to be the complex area. Even if any of these two methods is used, because the entry into the area determined to be the complex area can be limited, the two methods may achieve the same purpose.

The processor 180 may create the virtual wall using a standard of determining whether specific rule-based complex areas are adjacent to one another within a predetermined distance, and the like, but may create the virtual wall by using a first virtual wall creation model learned by using the machine learning algorithm or the deep learning algorithm.

The first virtual wall creation model may be a model that outputs a location to create a virtual wall in an inputted area, when information for the complex area and the non-complex area (an area not being the complex area) is inputted. That is to say, the processor 180 may create the virtual wall in a cleaning space by using information for the location to create the virtual wall outputted by the first virtual creation model.

At this time, when inputting the coordinates information for the space and whether the inputted area is the complex area in each coordinate, the first virtual wall creation model may output whether the virtual wall in each coordinate for the corresponding space is created.

In addition, when inputting the around map on which the complex area information is mapped, the first virtual wall creation model may output the around map on which the virtual wall is mapped.

At this time, the first virtual wall creation model may be composed of the artificial neural network.

At this time, the first virtual wall creation model may be a model supervised and learned using data for whether the specific area is the complex area, and training data labeling whether the virtual wall is created in the corresponding area.

In addition, the first virtual wall creation model may be a model learned by supervised learning by using training data including the around map on which the complex area information is mapped and a label indicating information for the virtual wall on the corresponding around map.

The first virtual wall creation model may be learned in the learning processor 130 of the AI robot 100, or may be learned in the learning processor 240 of the AI server 200. Further, the first virtual wall creation model may be stored in the memory 170 of the AI robot 100, and may be stored in the memory 230 or the model storage unit 231 of the AI server 200.

If the first virtual wall creation model is stored in the memory 170 of the AI robot 100, the processor 180 may determine a creation location of the virtual wall by using the acquired sensor data and the first virtual wall creation model stored in the memory 170.

If the first virtual wall creation model is stored in the memory 230 of the AI server 200, the processor 180 may transmit the acquired sensor data to the AI server 200 through the communication unit 110, and may receive a result for the creation location of the virtual wall determined using the sensor data and the first virtual wall creation model from the AI server 200.

In an embodiment, the processor 180 may map a creation result of the virtual wall for the SLAM map.

For example, if the virtual wall was created in the first area of the SLAM map in the first virtual wall creation model, the processor 180 may map the virtual wall for the first area of the SLAM map.

Then, the processor 180 of the AI robot 100 determines a cleaning route in consideration of the created virtual wall (S707).

The processor 180 may determine the cleaning route of avoiding the created virtual wall.

For example, the processor 180 may recognize the created virtual wall as an obstacle, and accordingly, the processor 180 may determine a cleaning route of cleaning by excluding the created virtual wall.

If the processor 180 is set to determine a cleaning route of making a turn in a specific direction (e.g., a clockwise direction) when the processor 180 meets the obstacle, the processor 180 may determine a cleaning route of moving in a clockwise direction on the basis of the created virtual wall.

Then, the processor 180 of the AI robot 100 controls a cleaning unit and a driving unit on the basis of the determined cleaning route (S709).

The processor 180 may control the driving unit 160 so that the AI robot 100 moves along the cleaning route.

The processor 180 may control the cleaning unit 190 so that the AI robot 100 performs a cleaning operation. Herein, the cleaning operation may be already set, or may be a cleaning operation selected by an input of a user.

The cleaning operation may include vacuuming and mopping.

If the cleaning operation is the vacuuming, the processor 180 may control the suction unit 191 to be operated, and if the cleaning operation is the mopping, the processor 180 may control the mopping nit 192 to be operated.

Accordingly, the AI robot 100 may preferentially clean an area determined to be uncomplicated to clean.

FIG. 7 illustrates only a method for determining the cleaning route of the AI robot 100 at a time, and the process shown in FIG. 7 may be repetitively performed in cleaning operation of an actual AI robot 100.

Figure 8:
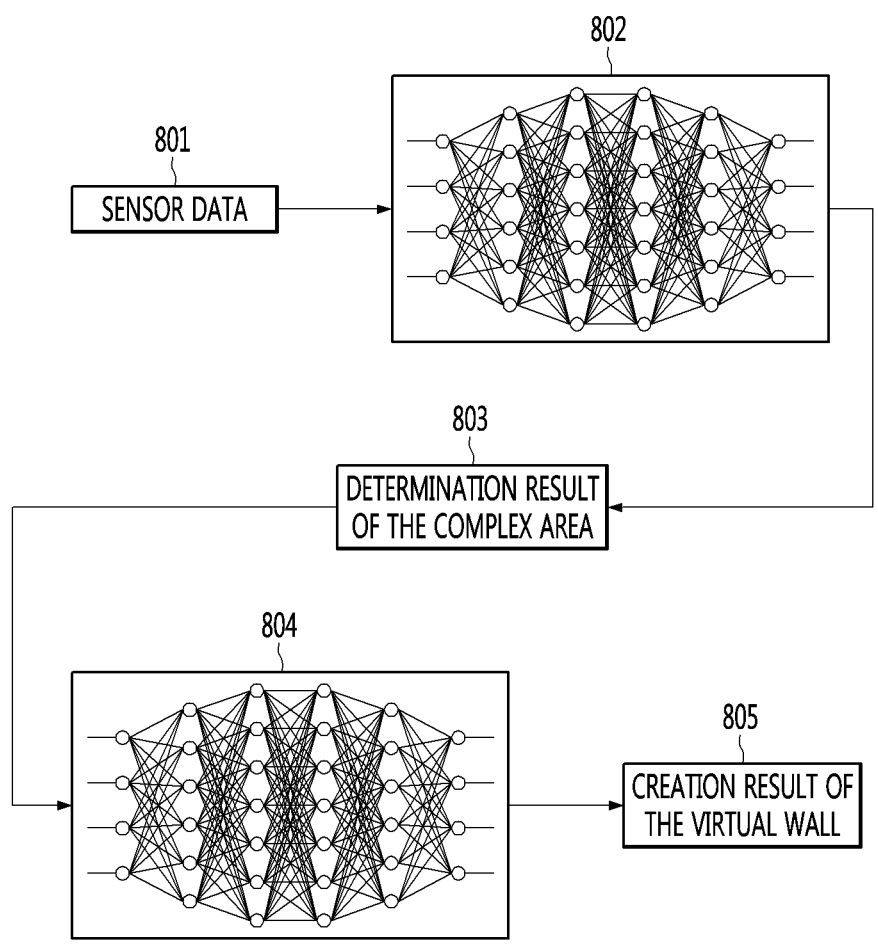
FIG. 8 is a diagram illustrating a method for creating a virtual wall according to an embodiment of the present invention.

FIG. 8 is a diagram illustrating a method for creating a virtual wall according to an embodiment of the present invention.

Referring to FIG. 8, the processor 180 may create a virtual wall by using a complex area determination model 802 and a first virtual wall creation model 804.

The complex area determination model 802 and the first virtual wall creation model 804 may be learned through the supervised learning by including the artificial neural network, as described above.

The complex area determination model 802 may output a determination result of the complex area 803 by distinguishing between a complex area and a non-complex area, if sensor data 801 is inputted.

If the determination result of the complex area 803 is inputted, the first virtual wall creation model 804 may output a creation result of the virtual wall 805 including information of a location in which a virtual wall will be created.

At this time, the complex area determination model 802 and the first virtual wall creation model 804 may input and output in the form of an around-map.

For example, if the around map on which the sensor data 801 is mapped is inputted, the complex area determination model 802 may output by mapping the complex area and the non-complex area on the around map as the determination result of the complex area 803, and the first virtual wall creation model 804 may output by mapping or placing the virtual wall on the around map as the creation result of the virtual wall 805, by receiving a result outputted from the complex area determination model 802 in the form of the around-map.

In FIG. 8, the complex area determination model 802 and the first virtual wall creation model 804 are displayed with the artificial neural network composed of fully connected layers, but the present invention is not limited thereto. That is to say, the complex area determination model 802 and the first virtual wall creation model 804 may be composed of various artificial neural network models, and, for example, may include CNN (Convolutional Neural Network), RNN (Recurrent Neural Network), and so forth.

FIGS. 7 and 8 illustrate an embodiment of distinguishing between the model for determining the complex area (the complex area determination model) and the model for creating the virtual wall (the first virtual wall creation model), but, according to an embodiment, the virtual wall may be created from the sensor data using only a simple virtual wall creation model (hereinafter referred to as "a second virtual wall creation model"). An embodiment of using the second virtual wall creation model will be described along with FIGS. 9 and 10.

Figure 9:
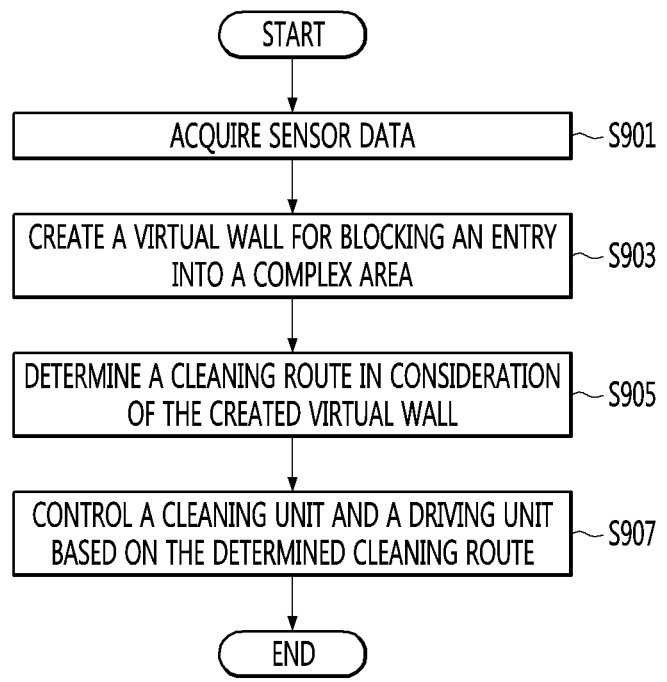
FIG. 9 is a flowchart illustrating a method for determining a cleaning route using sensor data according to an embodiment of the present invention.

FIG. 9 is a flowchart illustrating a method for determining a cleaning route using sensor data according to an embodiment of the present invention.

In FIG. 9, the descriptions overlapping with FIG. 7 are omitted.

Referring to FIG. 9, the processor 180 of the AI robot 100 acquires sensor data through the sensor unit 140 (S901).

This corresponds to the step (S701) of acquiring the sensor data in FIG. 7.

Then, the processor 180 of the AI robot 100 creates a virtual wall for blocking an entry into a complex area (S903).

Herein, the complex are may be the same as the complex area of FIG. 7, but is not necessarily required to be identical thereto. That is to say, in FIG. 7, the complex area is explicitly determined from the sensor data, and the virtual wall is created based on the determined complex area, but, in the present step (S903), the virtual wall may be created in a state of not explicitly determining the complex area.

The complex area may mean an area that has many obstacles, is narrow for the AI robot 100 to enter, or the like.

The processor 180 may create the virtual wall using a second virtual wall creation model learned using the machine learning algorithm or the deep learning algorithm.

The second virtual wall creation model may be a model of outputting a location in which the virtual wall will be created, within the inputted area, when sensor data for a predetermined area is inputted. That is to say, the processor 180 may create the virtual wall in the cleaning space by using information for the location in which the virtual wall outputted by the second virtual wall creation model will be created.

At this time, when coordinates information for a space and sensor data in each coordinate is inputted, the second virtual wall creation model may output whether the virtual walls in each coordinate are created with regard to the corresponding space, or may output the creation location of the virtual wall.

In addition, when an around map displaying a map for a space around the AI robot 100 including the sensor data is inputted, the second virtual wall creation model may output the around map on which the virtual wall is mapped.

At this time, the second virtual wall creation model may be composed of an artificial neural network.

At this time, the second virtual wall creation model may be a model learned by supervised learning by using training data including the sensor data for the specific area and a label indicating whether the virtual wall is created in the corresponding area.

In addition, the second virtual wall creation model may be a model by supervised learning by using training data including the around map on which the sensor data is mapped and a label indicating information for the virtual wall on the corresponding around map.

In an embodiment, the processor 180 may map a result of determination of complex area on the SLAM map.

For example, if the first area of the SLAM map was determined to be the complex area by the complex area determination model, the processor 180 may map information that the first area of the SLAM map is the complex area on the first area of the SLAM map.

The second virtual wall creation model may be learned in the learning processor 130 of the AI robot 100, or learned in the learning processor 240 of the AI learning server 200. In addition, the second virtual wall creation model may be stored in the memory 170 of the AI robot 100, and may be stored in the memory 230 or a model storage unit 231 of the AI server 200.

If the second virtual wall creation model is stored in the memory 170 of the AI robot 100, the processor 180 may determine the creation location of the virtual wall by using the acquired sensor data and the second virtual wall creation model stored in the memory 170.

If the second virtual wall creation model is stored in the memory 230 of the AI server 200, the processor 180 may transmit the acquired sensor data to the AI server 200 through the communication unit 110, and may receive a result for the creation location of the virtual wall determined using the sensor data and the second virtual wall creation model from the AI server 200.

In an embodiment, the processor 180 may map a creation result of the virtual wall on the SLAM map.

For example, if the virtual wall was created in the first area of the SLAM map by the second virtual wall creation model, the processor 180 may map the virtual wall on the first area of the SLAM map.

Then, the processor 180 of the AI robot 100 determines a cleaning route in consideration of the created virtual wall (S905).

This corresponds to the step (S707) of determining the cleaning route in FIG. 7.

Then, the processor 180 of the AI robot 100 controls a cleaning unit and a driving unit on the basis of the determined cleaning route (S907).

This corresponds to the step (S709) of controlling the cleaning unit and driving unit in FIG. 7.

FIG. 9 illustrates only a method for determining the cleaning route of the AI robot 100 at a time, and the process shown in FIG. 9 may be repetitively performed in cleaning operation of an actual AI robot 100.

Figure 10:
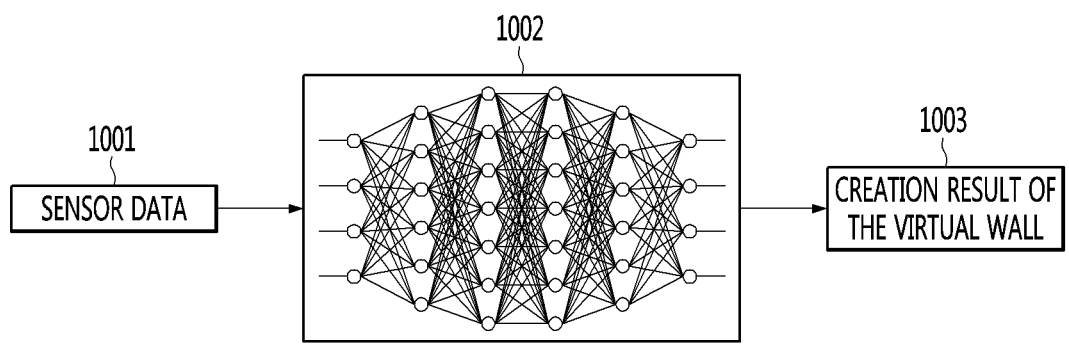
FIG. 10 is a diagram illustrating a method for creating a virtual wall according to an embodiment of the present invention.

FIG. 10 is a diagram illustrating a method for creating a virtual wall according to an embodiment of the present invention.

Referring to FIG. 10, the processor 180 may create the virtual wall by using a second virtual wall creation model 1002.

The second virtual wall creation model 1002 may be learned through the supervised learning by including the artificial neural network, as described above.

If sensor data 1001 is inputted, the second virtual wall creation model 1002 may output a virtual wall creation result 1003 including information of a location in which the virtual wall will be created. Herein, the virtual wall may be created in a location for blocking an entry into an area recognized to have low efficiency from the sensor data 1001 where the area is improper to clean to the AI robot or complicated over a predetermined level.

At this time, the second virtual creation model 1002 may determine a complex area if the sensor data 1001 is inputted, and may create the virtual wall on the basis of the determined complex area, as described above. In this case, the second virtual creation model 1002 may be considered as a simple connection of the complex area determination model 802 and the first virtual wall creation model 804 illustrated in FIG. 8.

At this time, the second virtual wall creation model 1002 may input and output in the form of the around-map.

For example, when inputting the around map on which the sensor data 1001 is mapped, the second virtual wall creation model 1002 may output by mapping or placing the virtual wall on the around map as the virtual wall creation result 1003.

In FIG. 10, the second virtual wall creation model 1002 is displayed with the artificial neural network composed of fully connected layers, but the present invention is not limited thereto. That is to say, the second virtual wall creation model 1002 may be composed of various artificial neural network model, and, for example, may include CNN (Convolutional Neural Network), RNN (Recurrent Neural Network), and so forth.

Figure 11:
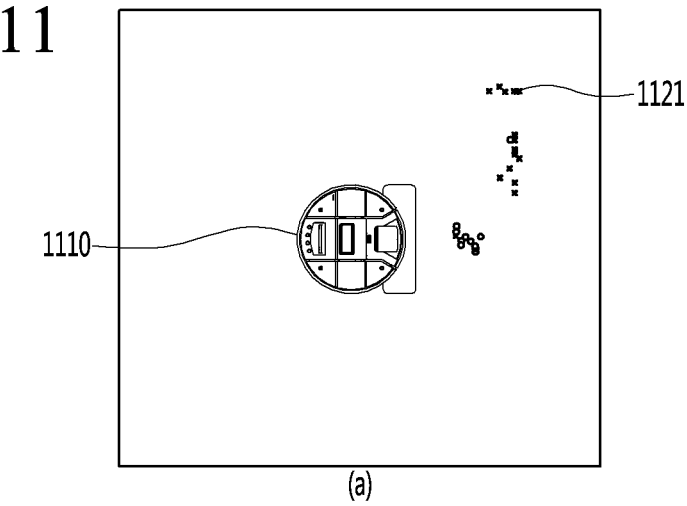
FIG. 11 is a diagram illustrating examples of an around map including a complex area and sensor data corresponding thereto in an embodiment of the present invention.
Figure 11:
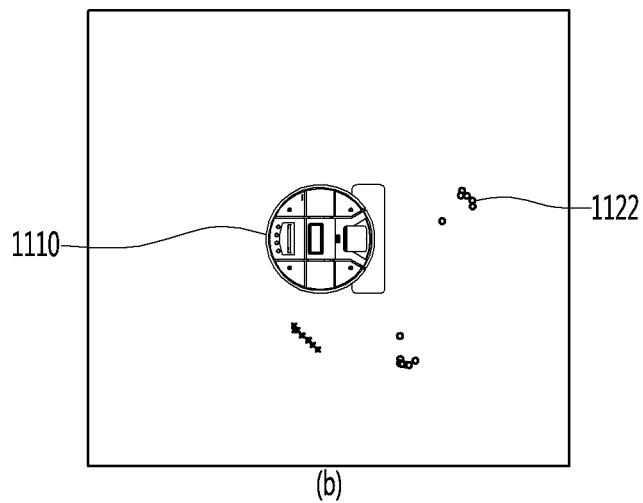
Figure 11:
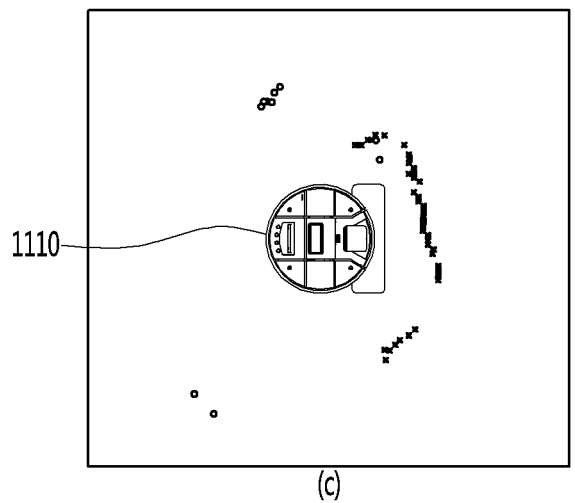

FIG. 11 is a diagram illustrating examples of an around map including a complex area and sensor data corresponding thereto in an embodiment of the present invention.

(a), (b) and (c) of FIG. 11 illustrate sensor data which an AI robot 1110 acquires in a space including many actual obstacles. Since FIG. 11 illustrates sensor data corresponding to the space including many actual obstacles, the sensor data is expected to be determined as the complex area by the processor 180.

Referring to FIG. 11, the AI robot 1110 is located in the center of the around map in (a), (b) and (c) of FIG. 11, and the sensor data acquired from the AI robot 1110 is mapped on the location around there.

Herein, in (a), (b) and (c) of FIG. 11, an x-shaped marker 1121 indicates a point in which a collision is sensed by a bumper sensor, and an o-shaped marker 1122 indicates a point in which an object is determined to be located from a 3D sensor (e.g., a distance sensor, an image sensor, a cliff sensor and so forth). Each of the markers (1121 and 1122) indicates that the acquired sensor data is mapped on the around map.

In the around map illustrated in (a), (b) and (c) of FIG. 11, the point in which an obstacle collision is sensed around the AI robot 1110 or the point in which the object is determined to be located is concentrated, and the processor 180 may determine that an area in which the mapped sensor is concentrated is the complex area.

Specifically, in (a) and (c) of FIG. 11, explicit obstacles are not identified from 3D sensor information, but many actual collisions happen, and accordingly, part of the area may be determined to be the complex area. In (b) of FIG. 11, a variety of small obstacles are identified from the 3D sensor information, but since the obstacles are near each other, the AI robot 1110 is difficult to enter. Hence, part of the area may be determined to be the complex area.

Figure 12:
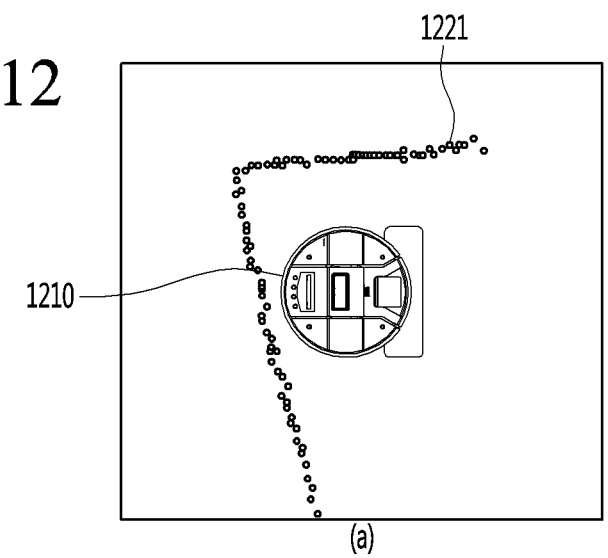
FIG. 12 is a diagram illustrating examples of an around map not including a complex area and sensor data corresponding thereto in an embodiment of the present invention.
Figure 12:
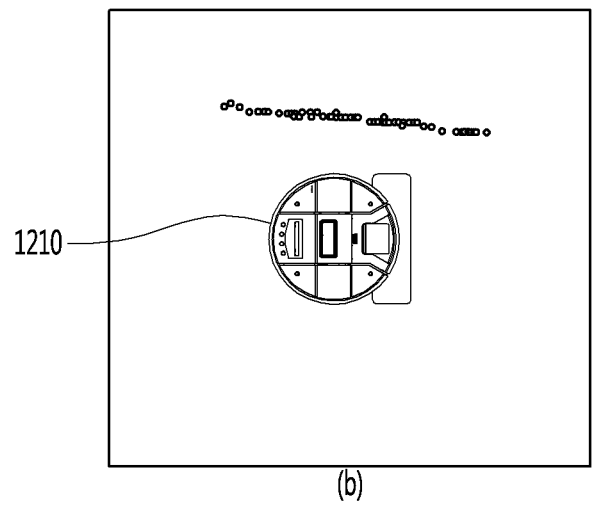

FIG. 12 is a diagram illustrating examples of an around map not including a complex area and sensor data corresponding thereto in an embodiment of the present invention.

(a) and (b) of FIG. 12 indicate sensor data which an AI robot 1210 acquires around a wall not including another obstacle.

Referring to FIG. 12, the AI robot 1210 is located in the center of the around map in (a) and (b) of FIG. 12, and the sensor data acquired from the AI robot 1210 is mapped on the location around there.

Herein, in (a) and (b) of FIG. 12, an o-shaped marker 1222 indicates a point in which an object is determined to be located from a 3D sensor (e.g., a distance sensor, an image sensor, a cliff sensor and so forth), similarly with FIG. 11. Each of the markers (1221) indicates that the acquired sensor data was mapped on the around map.

In the around map illustrated in (a) and (b) of FIG. 12, since obstacles may be recognized to be regularly enumerated from 3D sensor information of the AI robot 1210, the corresponding area may be determined to be the non-complex area.

Figure 13:
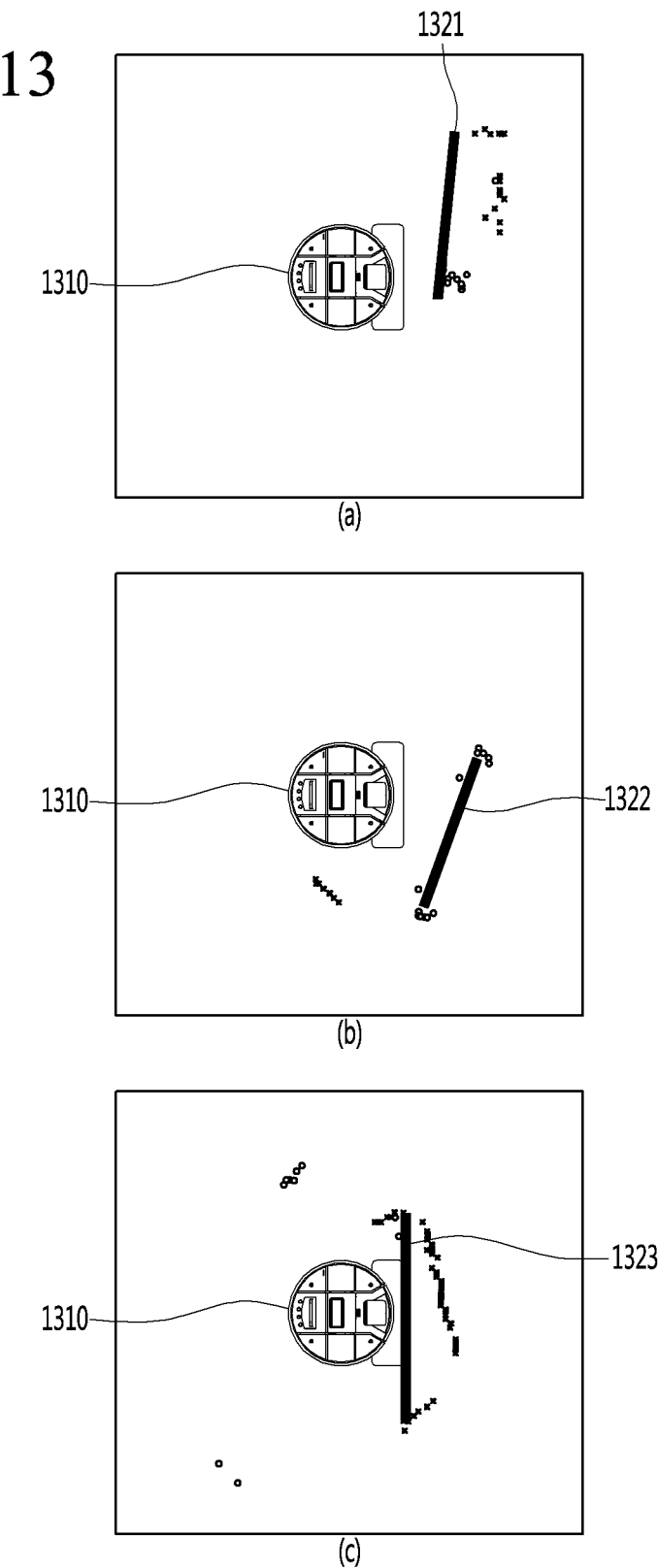
FIG. 13 is a diagram illustrating examples of a result of creating a virtual wall according to an embodiment of the present invention.

FIG. 13 is a diagram illustrating examples of a result of creating a virtual wall according to an embodiment of the present invention.

FIG. 13 illustrates a result of creating the virtual wall on the basis of examples of three sensor data shown in FIG. 11.

In particular, (a) of FIG. 13 indicates a result of mapping, on the around map, a first virtual wall 1321 created based on the sensor data of (a) of FIG. 11, (b) of FIG. 13 indicates a result of mapping, on the around map, a second virtual wall 1322 created based on the sensor data of (b) of FIG. 11, and (c) of FIG. 13 indicates a result of mapping, on the around map, a third virtual wall 1323 created based on the sensor data of (c) of FIG. 11.

Like FIG. 13, the processor 180 may stop the AI robot 1310 from entering into the complex area by creating the virtual walls (1321, 1322 and 1323) only in part of an area capable of blocking an entry into the complex area, not the whole of the complex area.

In addition, unlike FIG. 13, the processor 180 may stop the AI robot 1310 from entering into the complex area by creating the creating the virtual wall for the whole of the complex area.

Figure 14:
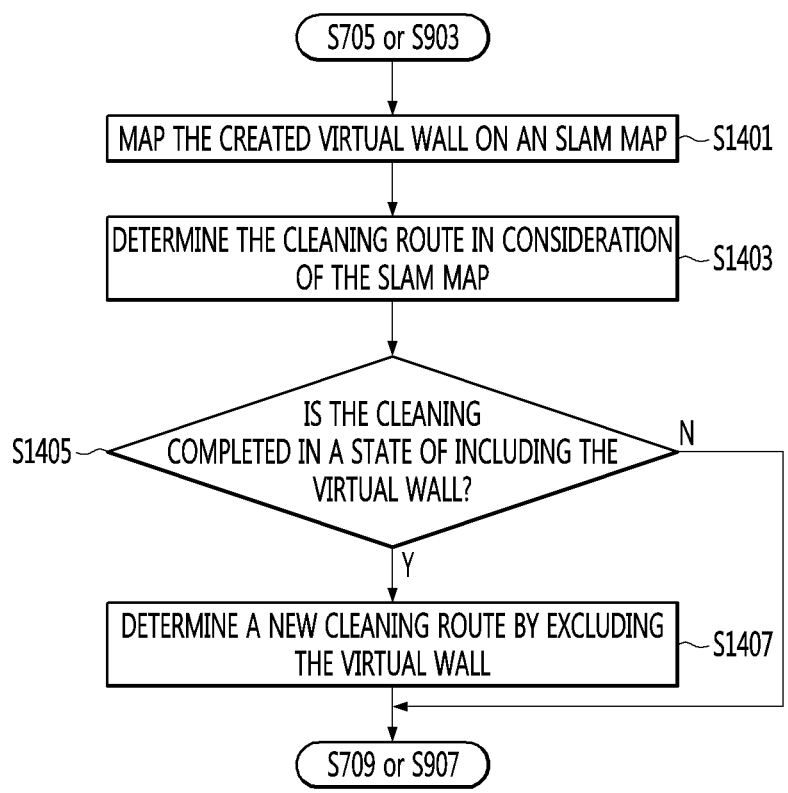
FIG. 14 is a flowchart showing an example of a step (S707 or S905) of determining the cleaning route in FIG. 7 or FIG. 9.

FIG. 14 is a flowchart illustrating an example of a step (S707 or S905) of determining the cleaning route in FIG. 7 or FIG. 9.

Referring to FIG. 14, the processor 180 of the AI robot 100 maps the created virtual wall on the SLAM map (S1401).

The above-described around map is a map for a predetermined adjacent area based on the AI robot 100, and is only a local map. However, as the SLAM map is a map for an overall active area of the AI robot 100, the SLAM map is a global map.

The step (S705 or S903) of creating the virtual wall shown in FIG. 7 or FIG. 9 creates the virtual wall in real time based on the sensor data acquired in real time. In addition, since the created virtual wall information is mapped on the around map, it may not provide global information when the AI robot 100 cleans an overall cleaning space.

However, by mapping the created virtual wall on the SLAM map, although the AI robot 100 moves to another space while the cleaning operation is performed, it may recognize a location for the created virtual wall.

Then, the processor 180 of the AI robot 100 determines a cleaning route that does not pass through the virtual wall in consideration of the SLAM map (S1403).

This includes that as a new virtual wall is created on the SLAM map, the processor 180 modifies the cleaning route that was determined previously.

Then, the processor 180 of the AI robot 100 determines whether the cleaning of a space capable of cleaning is completed in a state of including the virtual wall (S1405).

The virtual wall may be entered and cleaned by an actual AI robot 100, but is created for the purpose of not intentionally cleaning an area that includes lowered cleaning efficiency or restrainability. Hence, the processor 180 may recognize whether the cleaning of the non-complex area has been completed, by determining that the cleaning of the space capable of cleaning is completed in the state of including the virtual wall.

As a result of determination in the step (S1405), if the cleaning of the space capable of cleaning is not completed in the state of including the virtual wall, the processor 180 proceeds to the step (S709 or S907) of controlling the cleaning unit and driving unit on the basis of the determined cleaning route.

As a result of determination in the step (S1405), if the cleaning of the space capable of cleaning is completed in the state of including the virtual wall, the processor 180 determines a new cleaning route by excluding the virtual wall (S1407).

If the cleaning of the space capable of cleaning is completed in the state of including the virtual wall, an area in need of cleaning is only an area not cleaned due to the virtual wall. Thus, if all the cleaning of the space capable of cleaning is completed in the state of including the virtual wall, the processor 180 may determine a new cleaning route in a state of excluding the virtual wall.

Since the previous non-complex area has already been completed, the processor 180 may determine a new cleaning route so as to clean only the complex area.

At this time, the processor 180 may exclude all the virtual walls mapped on the SLAM map.

At this time, the processor 180 may stop a function of creating the virtual wall based on the sensor data, and may stop even a function of mapping the virtual map on the around map.

Then, the processor 180 proceeds to the step of controlling the cleaning unit and the driving unit on the basis of the determined cleaning route (S709 or S907).

Figure 15:
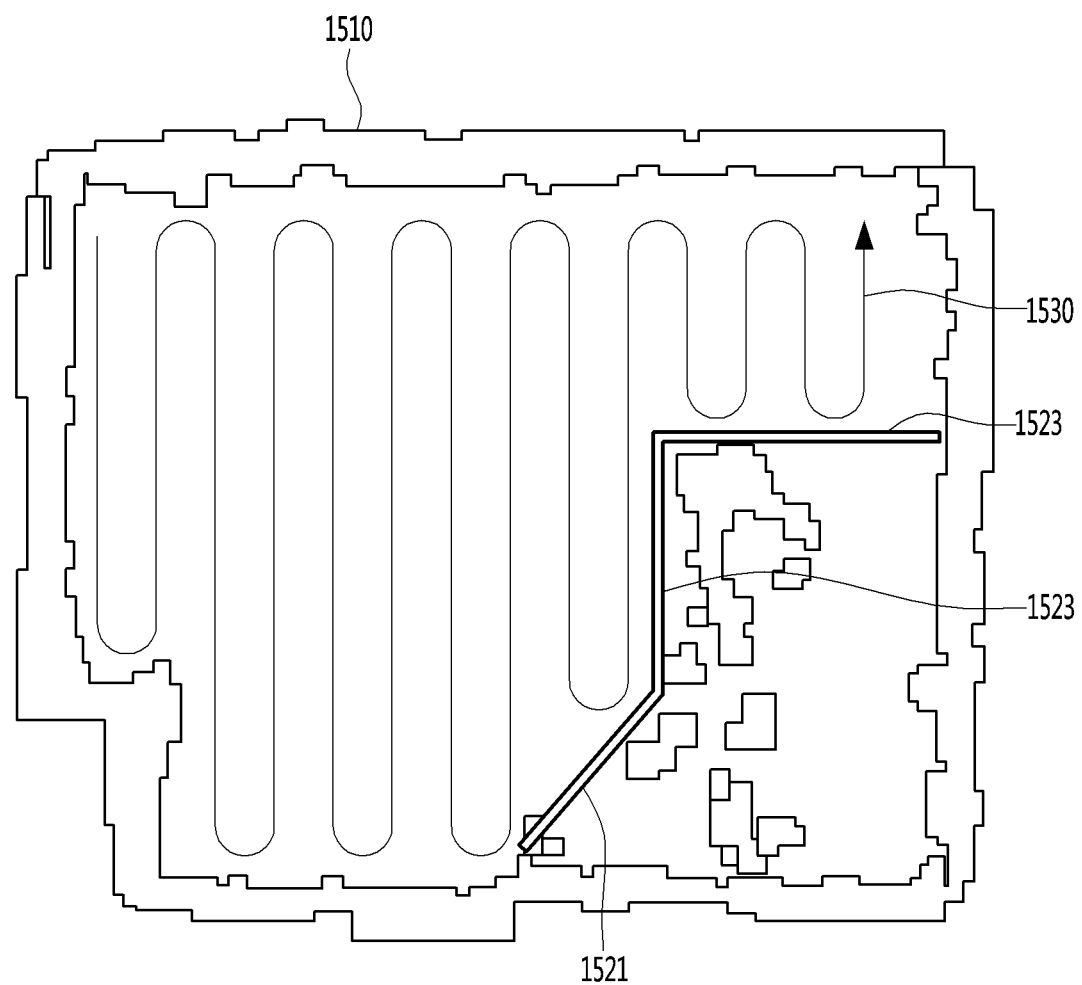
FIGS. 15 and 16 are diagrams illustrating examples of a cleaning route determined according to an embodiment of the present invention.
Figure 16:
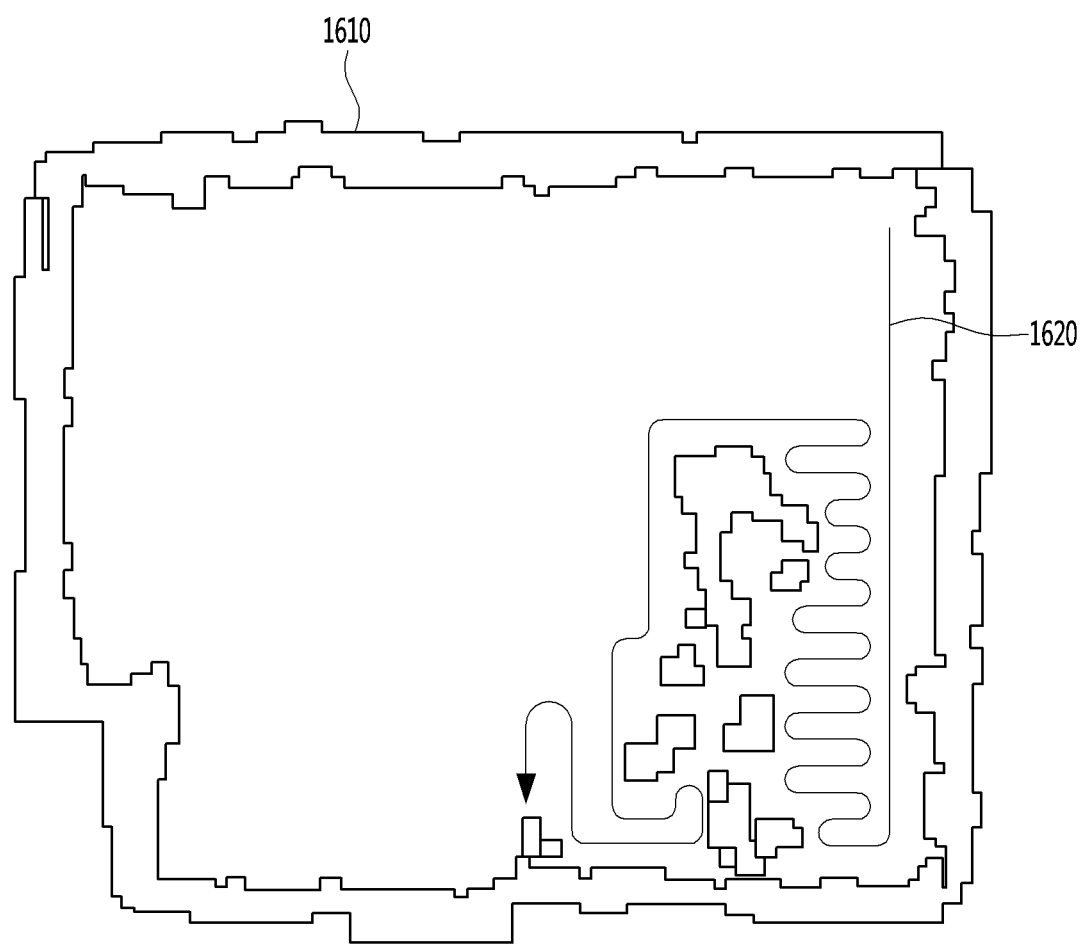

FIGS. 15 and 16 are diagrams illustrating examples of a cleaning route determined according to an embodiment of the present invention.

In particular, FIG. 15 is a diagram illustrating a cleaning route determined in the state of including the virtual wall, and FIG. 16 is a diagram illustrating a cleaning route determined in the state of excluding the virtual wall.

Referring to FIGS. 15 and 16, the processor 180 may create virtual walls 1521, 1522, 1523 from the sensor data acquired in real time, and may map the created virtual walls 1521, 1522, 1523 on an SLAM map 1510. Further, the processor 180 may determine a first cleaning route 1530 in consideration of the SLAM map 1510, and may perform the cleaning by controlling the cleaning unit and the driving unit along the first cleaning route 1530 that was determined.

If all the areas capable of cleaning were cleaned along the first cleaning route 1530 in the state of including the virtual walls 1521, 1522, 1523, the processor 180 may determine a second cleaning route 1620 by using an SLAM map 1610 excluding the virtual walls 1521, 1522, 1523, and may perform the cleaning with regard to the other areas by controlling the cleaning unit and the driving unit along the second cleaning route 1620 that was determined.

Accordingly, the AI robot 100 in accordance with various embodiments of the present invention may perform the cleaning posteriorly by determining the area difficult to clean using the sensor data acquired in real time.

In addition, the AI robot 100 in accordance with various embodiments of the present invention has an advantage of flexibly responding to a change in surrounding environment by creating the virtual wall on the around map by using the sensor data acquired in real time, as compared to a method of using only the SLAM map.

In addition, if only the SLAM map is used, it is greatly influenced by noises or errors of the SLAM map, but as the cleaning route is determined by using the sensor data acquired in real time, there is less impact from the noises or errors of the SLAM map.

According to an embodiment of the present invention, the above-described method may be implemented as a processor-readable code in a medium where a program is recorded. Examples of a processor-readable medium may include read-only memory (ROM), random access memory (RAM), CD-ROM, a magnetic tape, a floppy disk, and an optical data storage device.

What is claimed is:

1. An artificial intelligence (AI) robot for determining a cleaning route using sensor data, comprising:
   a sensor device including at least one of an image sensor, a depth sensor or a shock sensor;
   a cleaning device including at least one of a suction device or a mopping device;
   a driving device configured to drive the AI robot; and
   a processor configured to:
      acquire the sensor data from the sensor device,
      determine a complex area having adjacent complex areas using the acquired sensor data,
      create a virtual wall for blocking an entry into the determined complex area,
      determine the cleaning route in consideration of the created virtual wall, and
      control the cleaning device and the driving device based on the determined cleaning route,
   wherein the processor is further configured to create the virtual wall based on determining whether the adjacent complex areas include specific rule-based complex areas that are adjacent to one another within a predetermined distance,
   wherein the complex area is at least one of an area with a predetermined number of obstacles or an area having a predetermined width relative to access by the AI robot.

2. The AI robot of claim 1, wherein the processor is configured to:
   determine the complex area in an around map by using the acquired sensor data and the around map with regard to a predetermined radius around the AI robot, and
   create the virtual wall in the around map.

3. The AI robot of claim 2, wherein the processor is configured to determine the cleaning route by avoiding the virtual wall.

4. The AI robot of claim 3, wherein the processor is configured to create the virtual wall by including the complex area.

5. The AI robot of claim 3, wherein the processor is configured to create the virtual wall only in a passage entering into the complex area.

6. The AI robot of claim 1, wherein the processor is configured to determine the complex area from the acquired sensor data by using a complex area determination model learned using a machine learning algorithm or a deep learning algorithm.

7. The AI robot of claim 6, wherein the processor is configured to create the virtual wall from the determined complex area by using a first virtual wall creation model learned using the machine learning algorithm or the deep learning algorithm.

8. The AI robot of claim 1, wherein the processor is configured to create the virtual wall from the acquired sensor data by using a second virtual wall creation model learned using a machine learning algorithm or a deep learning algorithm.

9. The AI robot of claim 1, further comprising a memory for storing a Simultaneous Localization And Mapping (SLAM) map with regard to an operating space of the AI robot,
wherein the processor is configured to:
map the created virtual wall on the SLAM map, and
determine the cleaning route using the SLAM map which includes the virtual wall.

10. The AI robot of claim 9, wherein the processor is configured to determine a new cleaning route by excluding the virtual wall, if the cleaning along the cleaning route determined in consideration of the virtual wall is completed.

11. A method for determining a cleaning route using sensor data, the method performed by an artificial intelligence (AI) robot that includes a sensor, a cleaning device and a driving device, the method comprising:
acquiring the sensor data from the sensor, the sensor comprising at least one of an image sensor, a depth sensor or a shock sensor,
determining a complex area having adjacent complex areas using the acquired sensor data,
creating a virtual wall for blocking an entry into the determined complex area,
determining the cleaning route in consideration of the created virtual wall, and
controlling the cleaning device and the driving device based on the determined cleaning route,
wherein the method further comprises creating the virtual wall based on determining whether the adjacent complex areas include specific rule-based complex areas that are adjacent to one another within a predetermined distance,
wherein the complex area is at least one of an area with a predetermined number of obstacles or an area having a predetermined width relative to access by the AI robot.

12. A non-transitory computer readable recording medium containing a program for causing an artificial intelligence (AI) robot that includes a sensor, a cleaning device and a driving device to determine a cleaning route using sensor data, the method comprising:
acquiring the sensor data from the sensor, the sensor comprising at least one of an image sensor, a depth sensor or a shock sensor,
determining a complex area having adjacent complex areas using the acquired sensor data,
creating a virtual wall for blocking an entry into the determined complex area,
determining the cleaning route in consideration of the created virtual wall, and
controlling the cleaning device and the driving device based on the determined cleaning route,
wherein the method further comprises creating the virtual wall based on determining whether the adjacent complex areas include specific rule-based complex areas that are adjacent to one another within a predetermined distance,
wherein the complex area is at least one of an area with a predetermined number of obstacles or an area having a predetermined width relative to access by the AI robot.

* * * * *